United States Patent [19]
Kassai

[11] Patent Number: 4,848,787
[45] Date of Patent: Jul. 18, 1989

[54] BABY CARRIAGE

[75] Inventor: Kenzou Kassai, Osaka, Japan

[73] Assignee: Aprica Kassai Kabushikikaisha, Osaka, Japan

[21] Appl. No.: 211,342

[22] Filed: Jun. 24, 1988

[30] Foreign Application Priority Data

Jun. 26, 1987 [JP] Japan .................................. 62-160668

[51] Int. Cl.⁴ .............................................. B62B 11/00
[52] U.S. Cl. ..................... 280/642; 280/42; 280/649; 280/650; 297/42
[58] Field of Search ............... 280/642, 644, 42, 649, 280/650, 657, 658, 47.38; 297/42, 44, 45

[56] References Cited

U.S. PATENT DOCUMENTS

| 2,607,605 | 8/1952 | Lines | 280/644 |
| 3,231,053 | 1/1966 | Rutkowski | 280/642 X |
| 3,653,681 | 4/1972 | Virtue | 280/642 |
| 4,019,757 | 4/1977 | Beger et al. | 280/649 |
| 4,324,410 | 4/1982 | Perego | 280/42 |

FOREIGN PATENT DOCUMENTS

56-15100  4/1981  Japan .

Primary Examiner—Charles A. Marmor
Assistant Examiner—Michael Mar
Attorney, Agent, or Firm—W. G. Fasse; D. H. Kane, Jr.

[57] ABSTRACT

A baby carriage has front legs, rear legs disposed to cross the front legs, push rods pivotally connected at the lower ends thereof to the upper ends of the front legs, cross rods crossing each other in the form of the letter X and pivotally connected at the upper ends thereof to the push rods and at the lower ends to the rear legs, lateral frame members pivotally connected at the front ends thereof to the upper ends of the rear legs and at the rear ends thereof to the push rods, widthwise connecting members bendably constructed and defining the width of the baby carriage when the latter is in the opened state, push rod locking mechanisms for inhibiting the push rods from pivoting relative to the front legs when the baby carriage is brought into the opened state, and cross-rod locking mechanism adapted to abut against the upper ends of the cross-rod to inhibit an upward movement of the cross-rods when the baby carriage is brought into the opened state.

7 Claims, 12 Drawing Sheets

BABY CARRIAGE

FIELD OF THE INVENTION

This invention relates to a baby carriage adapted to be folded while reducing its width so that in a folded state its front wheels are positioned at the same level as its rear wheels so as to enable the baby carriage to stand by itself.

BACKGROUND INFORMATION

At present a wide variety of baby carriages are on the market. Consumers select from these baby carriages those which meet their tastes and requirements. The decisive factors in the selection, which differ from person to person, include the condition of being "lightweight." That is, a simple and lightweight construction can be said to be a factor which enhances the market value of baby carriages.

As a prior art of interest to this invention, there is a baby carriage disclosed in Japanese Utility Model Publication No. 15100/1981. The baby carriage disclosed in said publication is simple in construction and appears to contribute much to reducing weight. However, there is much room for improvement. Said baby carriage is foldably constructed, and when it is folded, its front and rear wheels are moved away from each other. As a result, in the folded state, the baby carriage extends substantially flat along the ground surface. In other words, the baby carriage cannot stand by itself. Therefore, there is an inconvenience when the baby carriage is carried around or when it is to be stored in a suitable location.

Further, the construction could be made simpler by reducing the number of parts constituting the skeleton of the baby carriage. This reduction, however, should not entail a loss of safety.

SUMMARY OF THE INVENTION

Accordingly, an object of the invention is to provide a baby carriage which is superior in safety, simple in construction and light in weight and which, when folded, is capable of standing by itself.

This invention is a baby carriage adapted to be folded while reducing its width from side-to-side so that in the folded state its front wheels are positioned at the same level as its rear wheels so as to enable the baby carriage to stand by itself, said baby carriage comprising;

a. a pair of front legs having a front wheel at the lower end thereof, b. a pair of rear legs each having a rear wheel at the lower end thereof, said rear legs being disposed to cross said front legs and pivotally connected to said front legs at the intersection, c. a pair of push rods pivotally connected at their respective lower ends to the upper ends of said front legs, d. a pair of cross rods crossing each other in the form of the letter X and pivotally connected at their upper ends to said push rods and at their lower ends to said pair of rear legs, e. a pair of lateral frame members pivotally connected at their front ends to the upper ends of said rear legs and at their lower ends to said push rods, f. a widthwise connecting member which is foldable and interconnects opposite sides of said baby carriage each composed of said front leg, rear leg, push rod and lateral frame member, said widthwise connecting member defining the width dimension of the baby carriage in the opened state, g. push rod locking means for inhibiting said push rods from pivoting relative to said front legs when said baby carriage is brought into the opened state, h. cross-rod locking means installed at the rear ends of said lateral frame members and adapted, when said baby carriage is brought into the opened state, to abut against the upper ends of said pair of cross rods to inhibit the upper ends of said cross-rods from pivoting upwardly.

According to this invention the baby carriage is reduced in number of parts constituting the skeleton thereof and is simple in construction and light in weight.

The opened state of the baby carriage is firmly maintained by the action of the push rod locking means and cross-rod locking means. That is, the push rod locking means inhibit the push rods from pivoting relative to the front legs while the cross-rod locking means fix the crossing angle of the pair of cross-rods.

When it is desired to fold the baby carriage, first, the locking provided by the push rod locking means is canceled. The rear ends of the pair of lateral frame members are pivotally connected to the push rods, while cross-rod locking means are installed on the rear ends of said lateral frame members. Therefore, if the push rods are tilted forward, the lock provided by the cross-rod locking means is canceled. Thus, the baby carriage is folded while reducing the side-to-side width of the carriage. Further, the front and rear wheels are moved toward each other. When the baby carriage is in the folded state, the front and rear wheels are positioned at substantially the same level, enabling the baby carriage to stand by itself.

When it is desired to fix the baby carriage in the opened state again, the lock provided by the push rod locking means is caused to act to inhibit the push rods from pivoting relative to the front legs. In this state, the cross-rod locking means abut against the upper ends of the pair of cross-rods to inhibit the upper ends of said cross-rods from moving upward, thereby fixing the crossing angle of said cross-rods.

As described above, in the baby carriage constructed according to the invention, the operation for fixing the open state of the baby carriage and the operation for canceling the fixed state are very easy.

Further, the pair of lateral frame members extend along the right and left lateral surfaces of the seat of the baby carriage.

Thus, if lateral plates are attached by utilizing the lateral frame members, lateral winds can be prevented from entering the baby carriage whereby a comfort feature can be attained.

These objects and other objects, features, aspects and advantages of the present invention will become more apparent from the following detailed description of the present invention when taken in conjunction with the accompanying drawings.

DESCRIPTION OF PREFERRED EMBODIMENTS AND OF THE BEST MODE OF THE INVENTION

Figure 1:
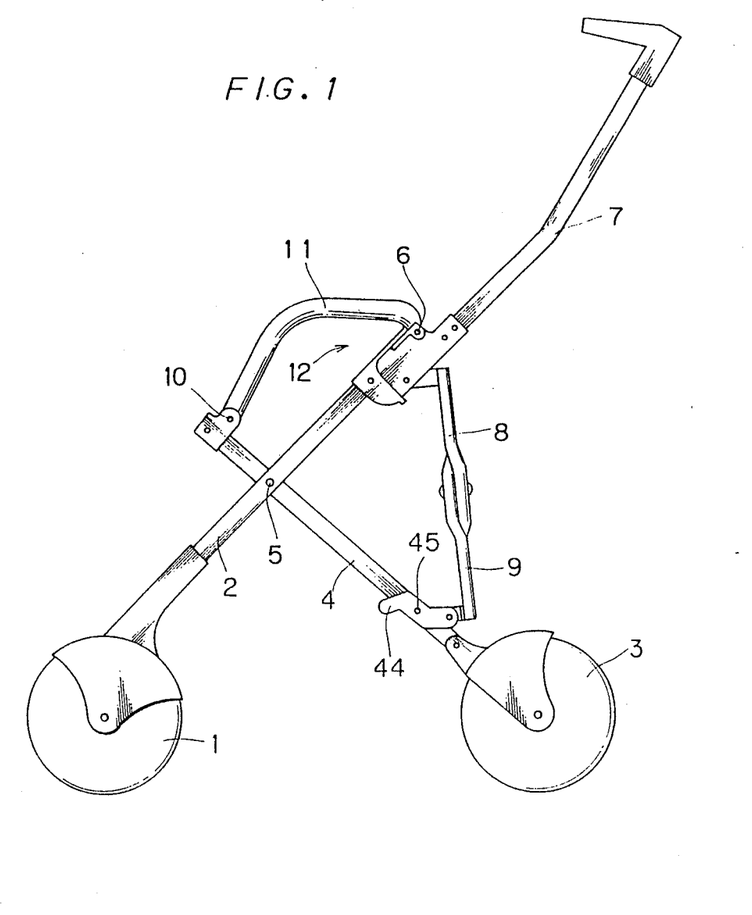
FIG. 1 is a side view showing a first embodiment of the invention.
Figure 2:
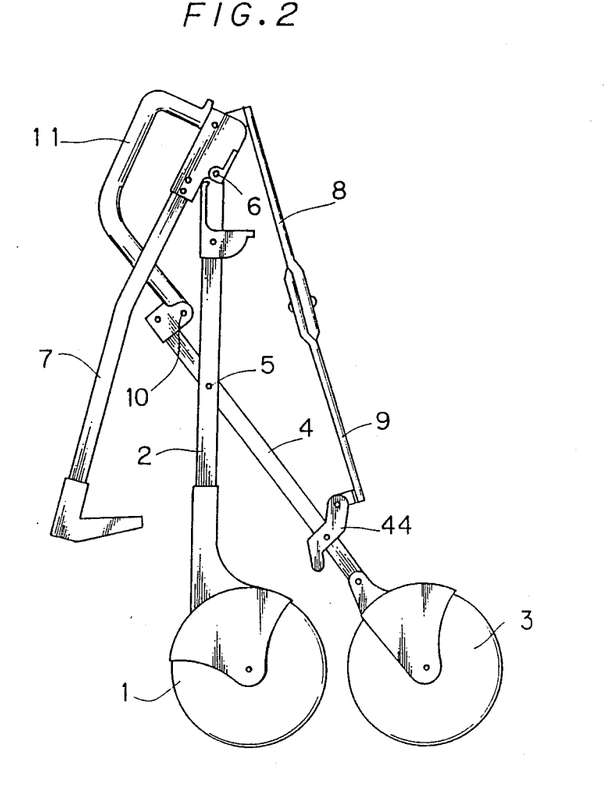
FIG. 2 is a side view showing the baby carriage of FIG. 1 in the folded state.

FIGS. 1 and 2 are left-handed side views of a first embodiment of this invention. FIG. 1 shows the opened state of a baby carriage and FIG. 2 shows its folded state. While the left-hand side surface of the baby carriage is shown in FIGS. 1 and 2, the form which appears on the right-hand side surface is substantially symmetrical with respect to the left-hand side surface shown in FIGS. 1 and 2.

The illustrated baby carriage comprises a pair of front legs 2 each having a front wheel 1 at the lower end thereof, a pair of rear legs 4 each having a rear wheel 3 at the lower end thereof and disposed to cross the associated front leg 2 and pivotally connected to the latter at the intersection by a pin 5, a pair of push rods 7 each turnably connected at the lower end thereof to the associated front leg 2 by a pin 6, a pair of cross-rods 8 and 9 crossing each other in the form of the letter X and pivotally connected at the upper ends thereof to the pair of push rods 7 and at the lower ends thereof to the pair of rear legs 4, a pair of lateral frame members 11 each turnably connected at the front end thereof to the upper end of the associated rear leg 4 by a pin 10 and at the rear end thereof to the associated push rod 7, a widthwise connecting member which interconnects the right and left side surfaces of the baby carriage, push rod locking means 12 for inhibiting the push rods 7 from pivoting relative to the front legs 2 when the baby carriage is brought into the opened state shown in FIG. 1, and cross-rod locking means for inhibiting the upper ends of the cross-rods 8 and 9 from moving upwardly when the baby carriage is brought into the opened state. The cross-rod locking means are each provided at the rear end of the lateral frame member 11 as will be described in more detail below.

Figure 3:
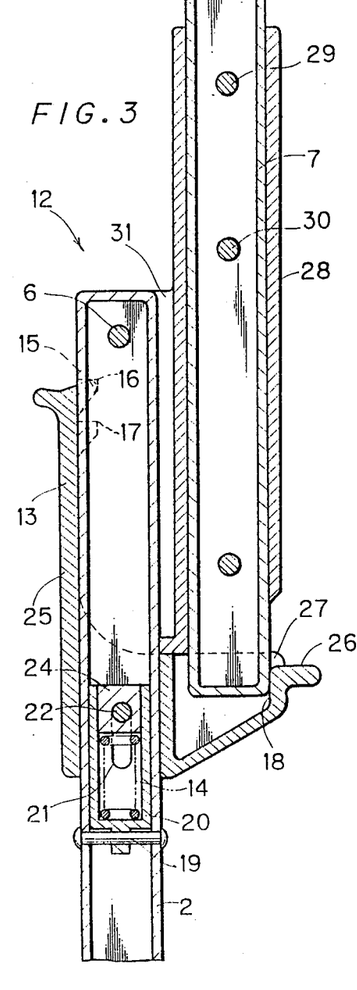
FIG. 3 is a side view, in section, of push rod locking means 12 applied to the baby carriage of FIG. 1.
Figure 4:
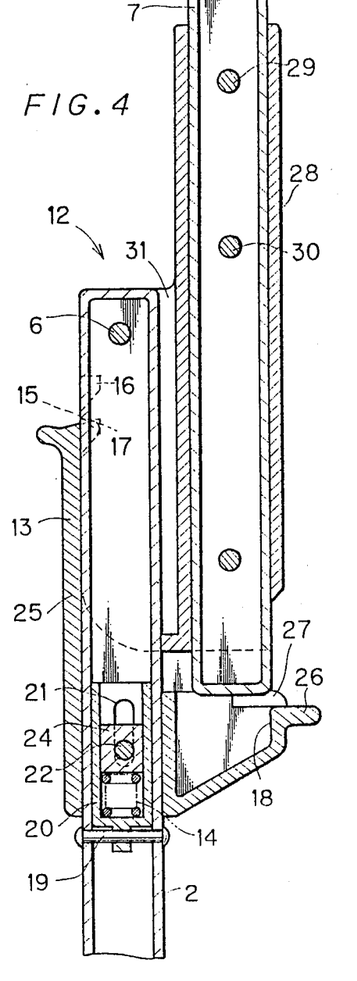
FIG. 4 is a view showing the state established by moving a slide member 13 downward from the state of FIG. 1.

In FIGS. 3 and 4, a side sectional view of the push rod locking means 12 for inhibiting the push rod from turning relative to the front leg 2 is shown. The illustrated push rod locking means 12 comprises a slide member 13, a spring 14, engagement protuberances 15, engagement recesses 16 and 17 adapted to receive said engagement protuberances 15, and an engagement wall 18.

Figure 5:
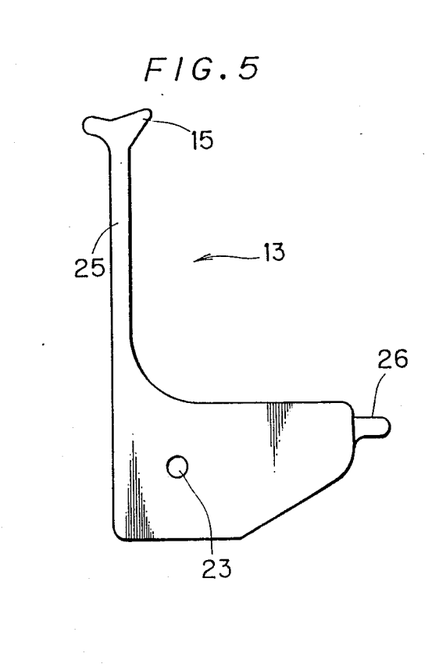
FIG. 5 is a side view of the slide member 13 shown in FIGS. 3 and 4.
Figure 6:
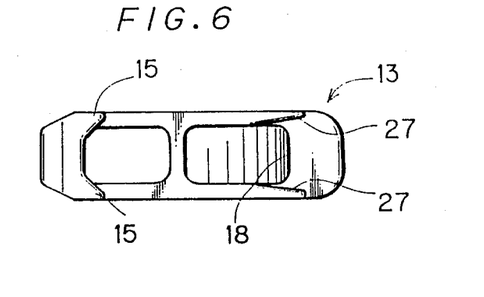
FIG. 6 is a plan view of the slide member 13.
Figure 7:
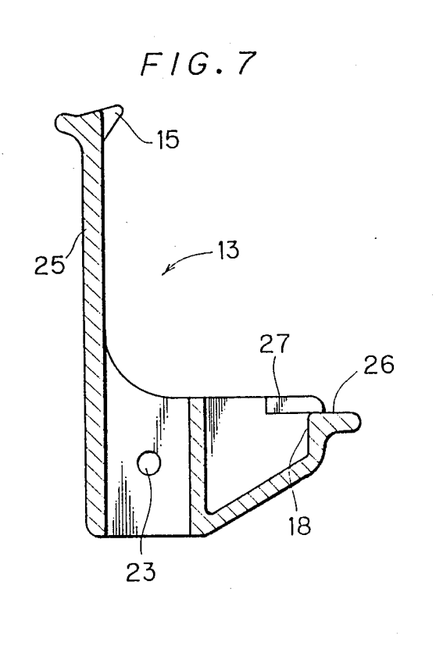
FIG. 7 is a side view, in section, of the slide member 13.
Figure 11:
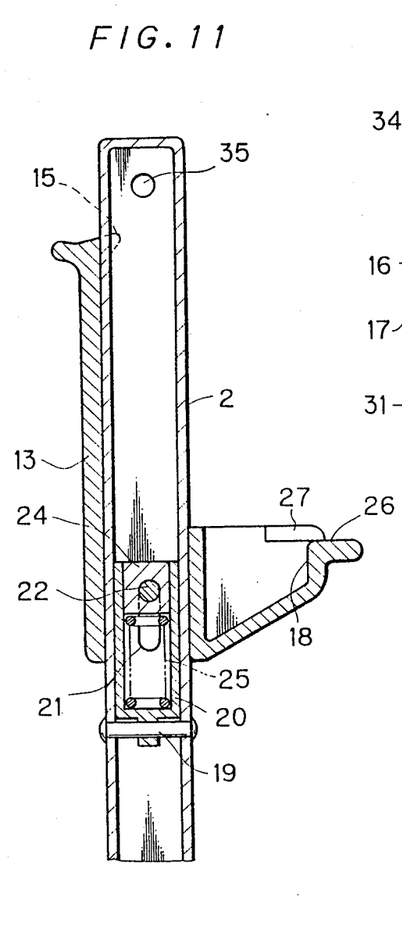
FIG. 11 is a side view, in section, showing the connection between the slide member 11 and the front leg 2.

FIGS. 5 to 7 show the slide member 13 also seen in FIG. 3. FIG. 11 is a side sectional view of the connection between the slide member 13 and the front leg 2. Referring to these figures, the slide member 13 is slidable in the upper end region of the front leg 2 along the length thereof between a first position where it is positioned relatively above and a second position where it is positioned relatively below. Stated more concretely, the upper end of the front leg 2 has a spring case 20 internally fixed thereto by a pin 19. The spring case 20 and front leg 2 have an elongated opening 21 which extends through them. A pin 22 extends through said opening 21, said pin 22 having the slide member 13 fixed thereto. A through-hole 23 shown in FIGS. 5 and 7 receives the pin 22. The slide member 13 is capable of vertically sliding by substantially the same amount as allowed by the range in which the pin 22 is movable in the elongated opening 21.

As shown in FIG. 11, in the interior of the front leg 2, the pin 22 has a spring support member 24 fixed thereto. The spring support member 24 is received in the spring case 20. A spring 25 is disposed between the bottom wall of the spring case 20 and the spring support member 24. The spring 25 constantly urges the spring support member 25 upward. In other words, the spring 25 urges the slide member 13 to return to its first upper position.

Referring to FIGS. 5 to 7, the slide member 13 has a columnar portion 25 extending along the front leg 2 which is inserted in the slide member 13, said columnar portion 25 having engagement protuberances 15 formed on the upper end thereof. Further, as best shown in FIG. 3, the slide member 13 has an engagement wall 18 for engaging the lower end of the push rod 7. A guide wall 26 continues this engagement wall 18. Further, as shown in FIG. 6. opposed walls for receiving the lower end of the push rod have a pair of inclined surfaces 27 so that the spacing therebetween is gradually decreased. The functions of the engagement wall 18, guide wall 26 and inclined surfaces 27 will be described below.

Figure 8:
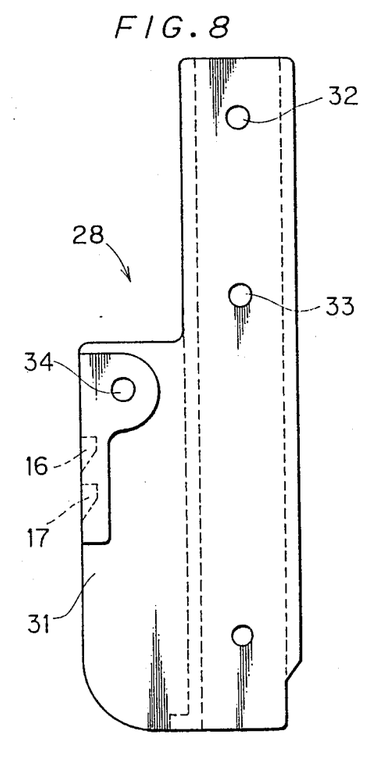
FIG. 8 is a side view of a push rod sleeve 28 shown in FIGS. 3 and 4.
Figure 9:
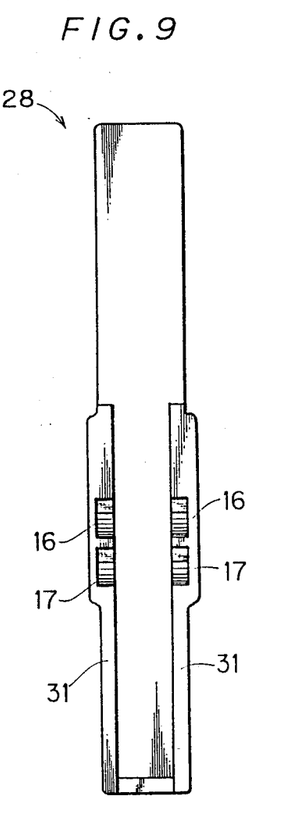
FIG. 9 is a front view of the push rod sleeve 28.
Figure 10:
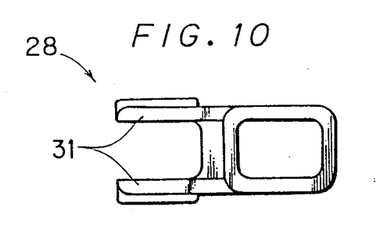
FIG. 10 is a plan view of the push rod sleeve 28.
Figure 12:
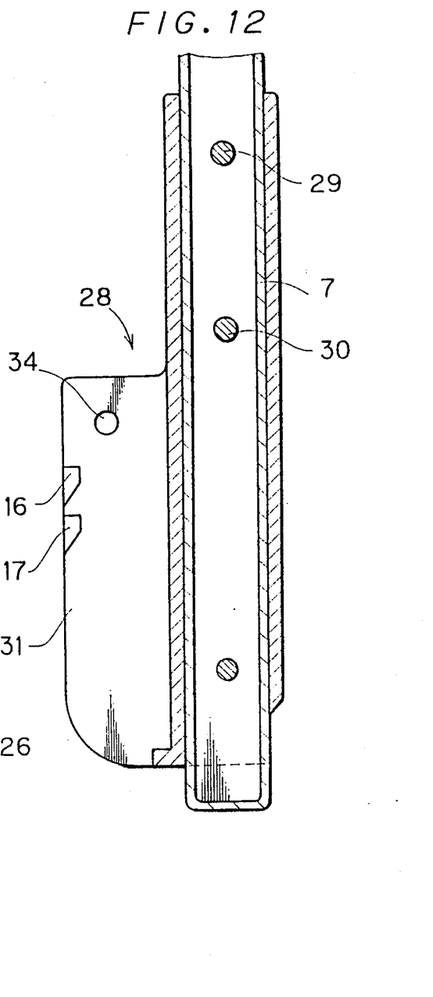
FIG. 12 is a side view, in section, of the connection between the push rod sleeve 28 and the push rod 7.

Referring to FIGS. 3 and 4, the lower end of the push rod 7 has a push rod sleeve 28, which surrounds said push rod, fixed thereto by pins 29 and 30. The push rod sleeve 28 is shown in FIGS. 8 to 10, and a side sectional view of the connection between the push rod sleeve 29 and the push rod 7 is shown in FIG. 12. Referring to these figures, the push rod sleeve 28 has a pair of bulging walls 31 projecting forward, said bulging walls 31 being pivotally connected to the upper end of the front leg 1 by the connecting shaft 6 shown in FIGS. 3 and 4. In other words, the push rod 7 is tiltable around the axis of the connecting shaft 6. Through-holes 32 and 33 shown in FIG. 8 are used to receive the pins 29 and 30, respectively. Further, the connecting shaft 6 also extends through a through-hole 34 shown in FIG. 8 and a through-hole 35 shown in FIG. 11.

The front end surfaces of the bulging walls 31 of the push rod sleeve 28 are in opposed relation to the columnar portion 25 of the slide member 13 when the baby carriage is in the opened state. And the front end surface of the bulging walls 31 are formed with engagement recesses 16 and 17 engageable with engagement protuberances 15 on the bulging walls 31.

As shown in FIG. 3, when the slide member 13 is in the first position where it is positioned in its relatively upper position, the engagement protuberances 15 on the slide member 13 engage the upper engagement recesses 16. On the other hand, when the slide member 13 is in the second position where it is positioned in its relatively lower position the engagement protuberances 15 engage the lower engagement recesses 17.

The operation of the push rod locking means 12 will now be described with reference to FIGS. 3 and 4.

When the baby carriage is in the opened state, the upper end of the front leg 2 is substantially parallel with the lower end of the push rod 7. When the slide member 13 is in the first position shown in FIG. 3, the engagement wall 18 is engaged with the lower end of the push rod 7, thereby inhibiting the push rod from pivoting. This locked state is firmly maintained by the action of the spring 14. Further, the engagement between the engaging protuberances 15 and the engagement recesses 16 also effectively acts to firmly maintain the locked state established by the engagement wall 18.

Figure 14:
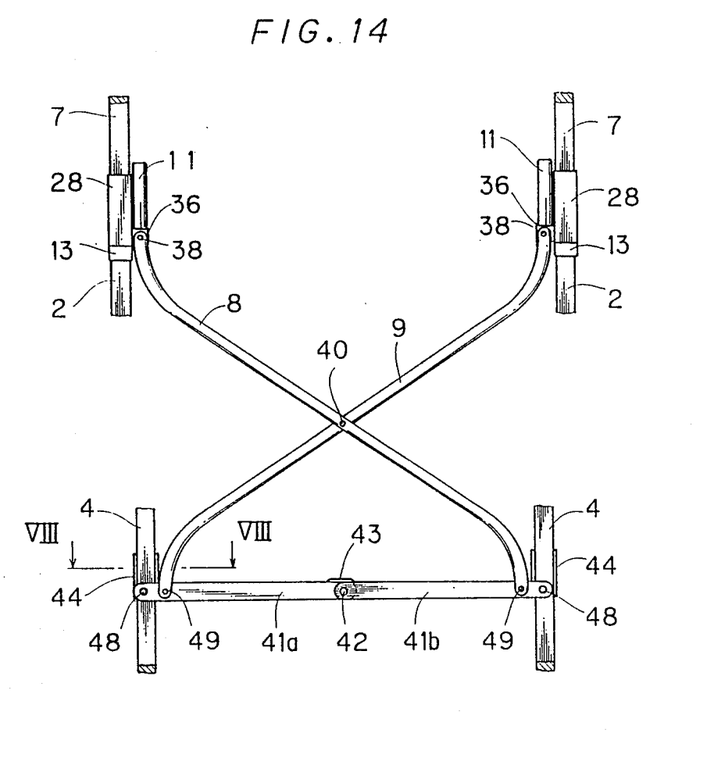
FIG. 14 is a view showing the construction of parts associated with a pair of cross rods 8 and 9.

When it is desired to fold the baby carriage, the slide member 13 is slid to the second position shown in FIG. 14. In response to the movement of the slide member 13, the columnar portion 25 once flexes outward, whereupon the engagement protuberances 15 engage the engagement recesses 17 in the push rod sleeve 28. The spring 14 acts to move the slide member 13 upward, but this upward movement is prevented by the engagement between the engagement protuberances 15 and the engagement recesses 17. When the slide member 13 is in the second position, the engagement between the engagement wall 18 and the lower end of the push rod 7 is canceled. Therefore, if the push rod 7 is pushed forward, the push rod sleeve 28 together with the push rod 7 are pivoted counterclockwise as viewed in FIG. 4. As a result, the engagement between the engagement protuberances 15 on the slide member 13 and the engagement recesses 17 in the push rod sleeve 28 is canceled, so that the slide member 13 returns to the first position shown in FIG. 3 under the action of the spring 14.

Next, the operation of the push rod locking means 12 which takes place when the baby carriage changes from the folded to the opened state, will be described.

Figure 13:
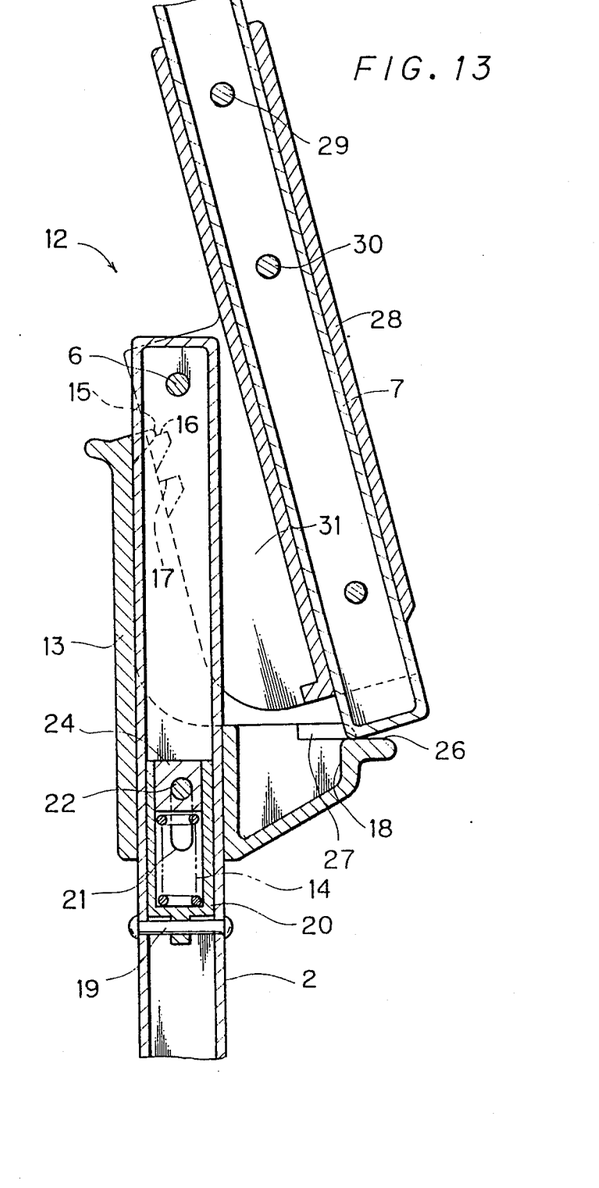
FIG. 13 is a view showing the lower end of the push rod 7 abutting against the guide wall 26 of the slide member 13.

To establish the opened state of the baby carriage, the push rod 7 is tilted, whereupon, as shown in FIG. 13, the lower end of the push rod 7 abuts against the guide wall 26 of the slide member 13. When the push rod 7 is further tilted clockwise, the guide wall 26 is pressed downward by the lower end of the push rod 7, whereby the slide member 13 is slid downward. And when the lower end of the push rod 7 comes to extend substantially parallel with the upper end of the front leg 2, the slide member 13 is slid upward under the action of the spring 14, whereby the state shown in FIG. 3 is obtained. Thus, the presence of the guide wall 26 makes it unnecessary to perform a special operation in locking the push rod locking means 12. However, if more or less detraction from operability is allowed, the guide wall 26 itself may be dispensed with. In that case, it would be necessary to manually slide the slide member 13 downward immediately before the upper end of the front leg 2 is substantially brought into parallelism with the lower end of the push rod 7.

In addition, the inclined surfaces 27 on the slide member 13 serve to smoothly guide the push rod as it is moved when the push rod 7 is tilted clockwise as viewed in FIG. 13.

In addition, the illustrated push rod locking means 12 is positioned on the left-hand side surface of the baby carriage; similar push rod locking means are provided on the right-hand side surface of the baby carriage.

Figure 15:
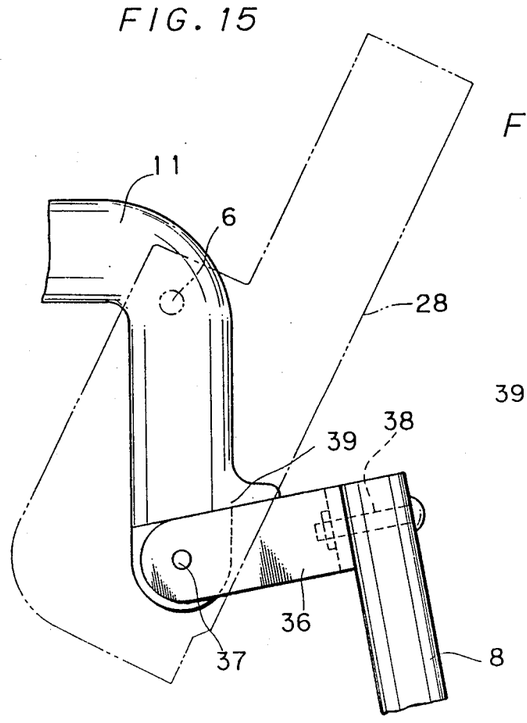
FIG. 15 is a side view showing parts associated with the rear end of a lateral frame member 11.
Figure 16:
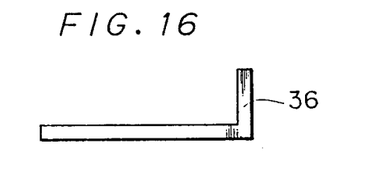
FIG. 16 is a plan view of a connecting member 36 shown in FIG. 15.
Figure 17:
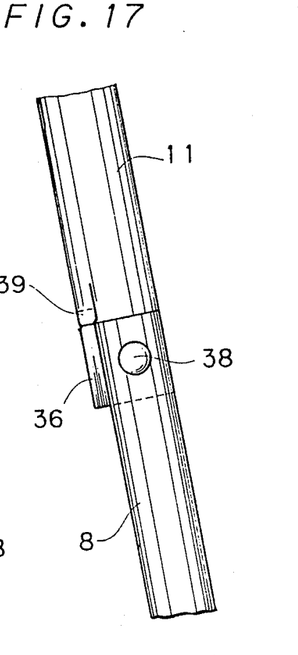
FIG. 17 is a view of the construction of FIG. 15 as seen from the back of the baby carriage.

The cross-rod locking means will now be described with reference to FIGS. 14 to 17. FIG. 14 is a rear view of the portion of the baby carriage associated with the pair of cross rods 8 and 9. FIG. 15 is a side view of the portion of the baby carriage associated with the rear end portion of the lateral frame member 11 positioned on the left-hand surface of the baby carriage. FIG. 16 is a top view of a connecting member 36 shown in FIG. 15. FIG. 17 is a view of the construction shown in FIG 15 as viewed from the rear of the baby carriage.

In FIG. 15, the push rod sleeve 28, which is shown in phantom lines, has a connecting member 36 tiltably or pivotally connected to the inner surface thereof by a pin 37 extending widthwise of the baby carriage. The rear end of the lateral frame member 11 is tiltably or pivotally connected to a connecting member 36 by the pin 37. The connecting member 37 is L-shaped, as shown in FIG. 16.

Referring to FIGS. 15 and 17, the rear end of the lateral frame member 11 is formed with a presser wall 39 capable of abutting against the upper surfaces of the connecting member 36 to inhibit the tilting movement of the connecting member 36.

Referring to FIGS. 14, 15, and 17, the pair of cross rods 8 and 9 cross each other in the form of the letter X and are pivotally connected together at the intersection by a pin 40. The upper ends of the cross-rods 8 and 9 are pivoted to the connecting members 36 by pins 38 extending longitudinally of the baby carriage. When the baby carriage is being folded out of the opened state, the upper ends of the pair of cross-rods 8 and 9 move upward, thereby moving the right and left sides of the baby carriage toward each other.

The lower ends of the pair of cross-rods 8 and 9 are pivotally connected to the rear legs 4 through tiltable brackets 44, stoppers 46 and rear end connecting members 41a and 41b. The construction associated therewith will be described with reference to FIGS. 1, 14, 18 and 19. In addition, this construction is provided on each of the right and left side surfaces of the baby carriage, and the following description is directed mainly to the members located on the left-hand side surface of the baby carriage.

Figure 18:
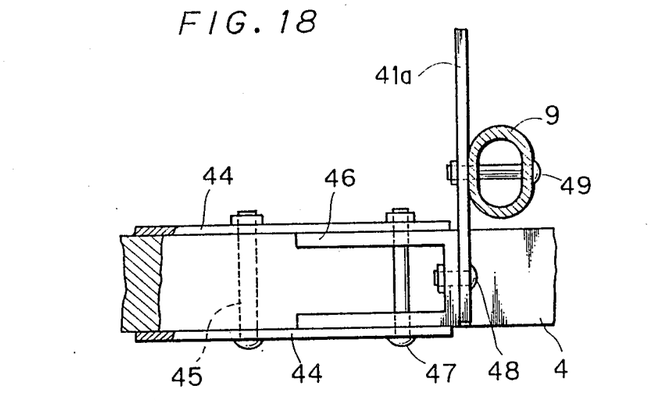
FIG. 18 is a view of the construction of the connection between the cross rod 9 and the rear leg 4 as seen from above, that is, a sectional view taken along the line VIII—VIII in FIG. 14.
Figure 19:
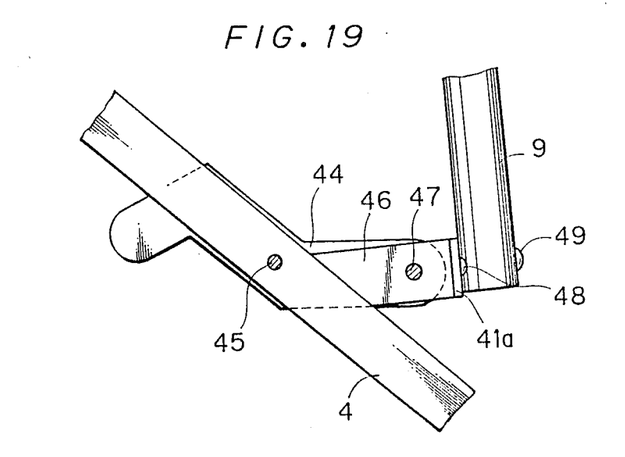
FIG. 19 is a view of the parts of FIG. 18 as seen laterally from the baby carriage.

The rear leg 4 has the tiltable bracket 44 pivoted to the lower end thereof by a pin 45 extending widthwise of the baby carriage. The tiltable bracket 44 is in the form of two plates holding the rear leg 4 therebetween. Further, as shown in FIGS. 18 and 19, the tiltable bracket 44 has a stopper 46 pivoted thereto by a pin 47 extending widthwise of the baby carriage. The stopper 46 abuts against the rear leg 4 when the baby carriage is brought into the opened state, whereby said stopper inhibits the tilting movement of the bracket 44 as shown in FIG. 19.

The pair of members 41a and 41b interconnect the rear legs 4 and are pivotally connected at their opposite ends to the stoppers 46 by pins 48 extending longitudinally of the baby carriage. The members 41a and 41b are in the form of two plates pivoted to each other by a pin 42. One plate 41a has an abutment portion 43 adapted to abut against the other plate 41b. In the state shown in FIG. 14, the abutment portion 43 abuts against the other plate 41, thereby inhibiting downward bending. When the baby carriage is folded, the rear end connecting members 41a and 41b act to bend the middle portion upward, thereby reducing the spacing between the rear legs 4. The lower ends of the pair of cross-rods 8 and 9 are pivoted to the rear end connecting members 41a and 41b by pins 49.

When the baby carriage is brought into the opened state with the push rod locking means 12 inhibiting the push rod 7 from tilting relative to the front legs 2, the presser wall 39 of the lateral frame member 1 abuts against the upper surface of the connecting member 36, as shown in FIG. 15, inhibiting the tilting movement of the connecting member 36. Therefore, the upper ends of the pair of cross-rods 8 and 9 connected to the connecting members 36 by pins 38 are prevented from moving upward. Further, as shown in FIG. 14, the lower ends of the cross-rods 8 and 9 are connected to the rear end connecting members 41a and 41b which are inhibited from bending downward, since the crossing angle of the cross-rods 8 and 9 is fixed to maintain the spacing between the right and left lateral surfaces of the baby carriage at a constant value.

Referring to FIG. 15, when the push rod sleeve 28 tilts counterclockwise around the axis of the connecting shaft 6 in response to the folding of the baby carriage, the pin 37 also rotates counterclockwise. Therefore, the upper ends of the pair of cross-rods 8 and 9 move upward, causing the right and left surfaces of the baby carriage to move toward each other. In addition, at this time, the connecting members 41a and 41b shown in FIG. 14 act to bend the middle portion thereof upward. Finally, the baby carriage is brought into the folded state shown in FIG. 2. In this folded state, the front and rear wheels 1 and 3 are positioned at the same level, enabling the baby carriage to stand by itself while reducing the spacing between the right and left lateral surfaces of the baby carriage.

If, again, the baby carriage is brought into the opened state and the tilting movement of the push rod 7 relative to the front leg 2 is inhibited, the presser wall 39 of the lateral frame member 11 inhibits the turning movement of the connecting member 36, as shown in FIG. 15. In other words, the crossing angle of the cross-rods 8 and 9 is automatically fixed.

As described above, according to the embodiment shown in FIGS. 1 to 19, the operation for locking the opened state of the baby carriage and the operation for canceling the locked state thereof are very easy. Further, the pair of lateral frame members 11 extend along the right and left side surfaces of the seat of the baby carriage. As shown in FIG. 1, the lateral frame member 11 is shaped to extend upward from its front end and bends at its middle portion and then extends horizontally toward the back from the bent portion. If lateral plates are attached to the lateral frame members 11, entrance of wind blowing laterally of the baby carriage is prevented. Such lateral plates also provide an improved safety. In the embodiment shown in FIG. 1, the seat of the baby carriage is installed by utilizing the push rods 7 and frong legs 2.

Further, the rear leg connecting members 41a and 41b have been shown as widthwise connecting members for interconnecting the right and left side surfaces of the baby carriage and defining the width of the baby carriage in its opened state. However, such widthwise connecting members will also be installed between the pair of front legs 2 and between the pair of push rods 7. Further, in the illustrated embodiment, a pair of push rods 7 has been used; however, these push rods 7 may be replaced by a single inverted U-shaped push rod which comprises two legs and an upper end connecting portion interconnecting the upper ends of said legs. In that case, the upper end connecting portion is bendable at the middle.

Figure 20:
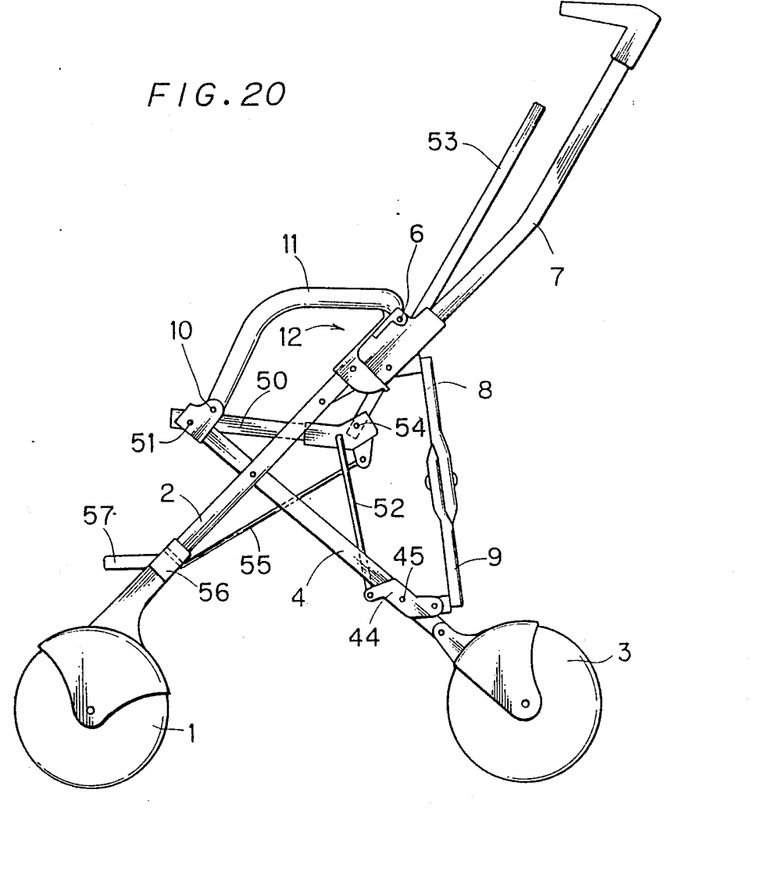
FIG. 20 is a side view of a second embodiment of the invention.

FIG. 20 is a side view of a second embodiment of the invention. In this second embodiment, the members equivalent or corresponding to those used in the first embodiment shown in FIG. 1 are marked with the same reference numerals and a description thereof will be omitted.

The second embodiment comprises, in addition to the components of the first embodiment, a pair of seat support rods 50, a pair of link rods 52, a pair of backrest support members 53, a pair of prop rods 55, a front leg connecting member 56, and a footrest member 57. Each seat support rod 50 is pivotally connected at the front end thereof to the upper end of the rear leg 4 by a pin 51. The rear end of the seat support rod 50 is connected to the tilting bracket 44 by the link rod 52. The backrest support rod 50 is pivotally connected to the rear end of the seat support rod 50 by a pin 54.

Figure 21:
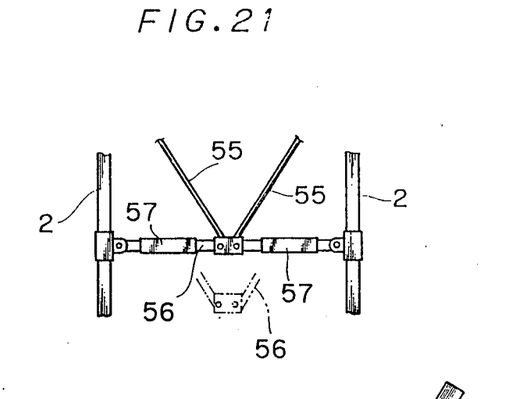
FIG. 21 is a view of parts associated with the front leg connecting member 56 of the baby carriage of FIG. 20 as seen from the baby carriage.

FIG. 21 is a view of the parts associated with the front leg connecting member 56 extending to interconnect the pair of front legs 2 as viewed from the front of the baby carriage. In FIG. 21, the downwardly bent state is shown in phantom lines. The pair of prop rods 55 connect the rear ends of the pair of seat support rods 50 to the middle of the front leg connecting member 56. When the seat support rods 50 are tilted clockwise in FIG. 20 in response to the folding of the baby carriage, the front leg connecting member 56 is urged to bend downward by the prop rods 55. As a result, the spacing between the front legs 2 is reduced. In addition a footrest member 57 for supporting the feet of a child is mounted on the front leg connecting member 56.

In the opened state of the baby carriage, the tilting brackets 44 are inhibited from turning. Therefore, the position of the seat support rods 50 supported by the turning brackets through the link rods 52 is firmly fixed.

Figure 22:
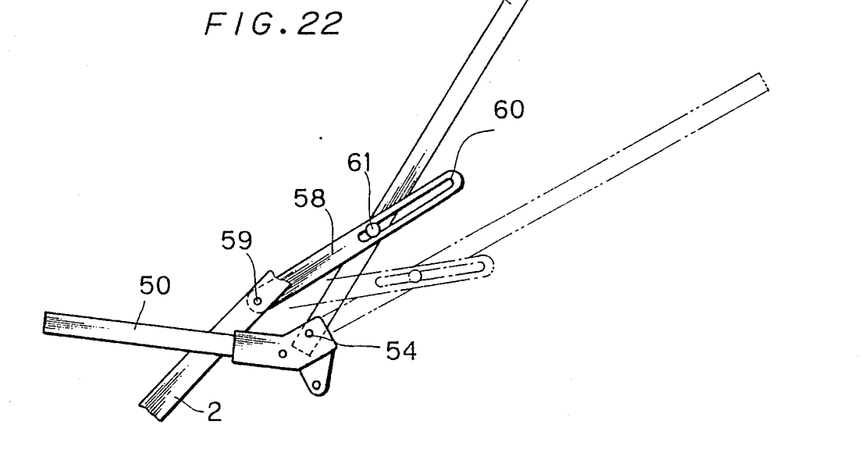
FIG. 22 is a view showing reclining adjusting means employed in the baby carriage of FIG. 20.

FIG. 22 is a side view showing the construction of the parts associated with the backrest support member 53. In this figure, those parts having nothing to do with the description of the second embodiment are omitted. The backrest support member 53 is adapted to be fixed in any desired angular position by reclining adjusting means. More specifically, the front leg 2 has a reclining adjusting member 58 pivotally connected thereto by a pin 59. The reclining adjusting member 58 has an elongated opening 60. And the backrest support member 53 has a knob 61 disposed thereon. This knob 61 is positioned in the elongated opening 60 in the reclining adjusting member 58. In FIG. 22, if the knob 61 is tightened, the crossing angle between the reclining adjusting member 58 and the backrest support member 53 is fixed, the backrest support member 53 being fixed in the illustrated inclined state. If the knob 61 is loosened from this state, the fixed state between the reclining adjusting member 58 and the backrest support member 53 is canceled, making it possible to tilt the backrest support member 53. After the backrest support member 53 has been tilted to a desired angular position, the know 61 is tightened again, whereby the backrest support member 53 is fixed in that position. In addition, the reclining adjusting means is shown merely by way of example and other forms of reclining adjusting means can, of course, be employed.

According to the second embodiment shown in FIG. 2, since the baby carriage is equipped with seat support rods 50 and backrest support members 53, the baby carriage has a somewhat more sturdy construction.

Although the present invention has been described and illustrated in detail, it is clearly understood that the same is by way of illustration and example only and it is not to be taken by way of limitation, the scope of the present invention being limited means by the terms of the appended claims.

What is claimed is:

1. A foldable baby carriage comprising: a pair of laterally spaced front legs, each front leg having a front wheel at a lower end thereof, a pair of laterally spaced rear legs, each rear leg having a rear wheel at a lower end thereof, said rear legs being disposed to cross said front legs approximately in an X configuration and pivotally connected to said front legs, a pair of push rods pivotally connected at their lower ends to respective upper ends of said front legs, a pair of cross rods pivotally interconnected approximately in an X configuration, said cross rods being pivotally connected at their upper ends to said push rods and pivotally connected at their lower ends to said pair of rear legs, a pair of longitudinally extending, lateral frame members, said frame members having front ends pivotally connected to the upper ends of said rear legs and rear ends pivotally connected to said push rods, a transverse connecting member which is foldable and pivotally connected at opposite ends to said rear legs, said transverse connecting member defining the width dimension of the baby carriage in an opened state, push rod locking means for inhibiting said push rods from pivoting relative to said front legs when said baby carriage is brought into the opened state, and cross-rod locking means installed at the rear ends of said lateral frame members and adapted, when said baby carriage is brought into the opened state, to abut against the upper ends of said pair of cross rods to inhibit the upper ends of said cross-rods from pivoting upward, wherein said baby carriage is adapted to be folded by pivoting said push rods forwardly toward said front legs while opposite sides of said baby carriage, formed by said front legs, rear legs, push rods, and lateral frame members, are moved inwardly toward each other and with said front and rear wheels moved together in close proximity and at the same level so as to enable the baby carriage to stand by itself.

2. The baby carriage as set forth in claim 1, wherein said cross-rod locking means comprises: a connecting member pivotally held on said push rod and said lateral frame member by a transverse pin and pivotally connected to the upper end of said cross rod by a pin extending longitudinally of said baby carriage, and a presser wall formed on the rear end of said lateral frame member and adapted to abut against the upper surface of said connecting member when said baby carriage is brought into the opened state.

3. The baby carriage as set forth in claim 1, wherein said transverse connecting member comprises a rear leg connecting member which is foldable about a central pivot point, the lower ends of said pair of cross rods being pivotally connected to the opposite ends of said rear leg connecting member.

4. The baby carriage as set forth in claim 3, further comprising: a tilting bracket pivotally connected to the lower end of said rear leg by a transversely extending pin, and stopper means pivotally connected to said tilting bracket by a transversely extending pin and adapted to abut against said rear leg when said baby carriage is brought into the opened state, thereby inhibiting pivotal movement of said tilting bracket, said rear leg connecting member being pivotally connected to said stopper means by a longitudinally extending pin.

5. The baby carriage as set forth in claim 4, further comprising: a pair of seat support rods pivotally connected at their front ends thereof to the upper ends of said rear legs, and a pair of link rods pivotally connected to their upper ends thereof to the rear ends of said seat support rods and at their lower ends thereof to said turning brackets.

6. The baby carriage as set forth in claim 5, further comprising: a pair of backrest support members pivotally connected at their lower ends thereof to the rear ends of said seat support rods, and reclining adjusting means for fixing the angle of inclination of said backrest support member.

7. The baby carriage as set forth in claim 1, wherein said lateral frame member has a downwardly inclined forward portion and a substantially horizontal rearward portion.

* * * * *